United States Patent [19]

Lane

[11] 3,947,539

[45] Mar. 30, 1976

[54] METHOD FOR COLD FORMING PLASTIC ARTICLE

[75] Inventor: Eckel R. Lane, Midland, Mich.

[73] Assignee: The Dow Chemical Company, Midland, Mich.

[22] Filed: July 10, 1972

[21] Appl. No.: 270,074

[52] U.S. Cl............. 264/320; 260/79.3 R; 264/83; 264/292
[51] Int. Cl.² ..................... B29B 1/00; B29C 17/03
[58] Field of Search...................... 264/83, 292, 320; 260/79.3 R

[56] References Cited
UNITED STATES PATENTS

| | | |
|---|---|---|
| 2,937,066 | 5/1960 | Walles............................ 260/79.3 R |
| 3,021,570 | 2/1962 | Podesta et al. ..................... 264/325 |
| 3,487,139 | 12/1969 | Mojonnier et al. .................. 264/292 |
| 3,592,724 | 7/1971 | King, Jr. et al. ............... 260/79.3 R |

Primary Examiner—Robert F. White
Assistant Examiner—Gene Auville
Attorney, Agent, or Firm—M. S. Jenkins

[57] ABSTRACT

Plastic substrate in the form of sheet, disk, or plate is advantageously converted to a shaped article by first surface sulfonating the plastic substrate and thereafter cold forming the plastic substrate to the desired shape. Surface sulfonation of the plastic substrate prior to cold forming eliminates the need for lubricating the plastic substrate or surfaces of the cold forming apparatus.

5 Claims, No Drawings

3,947,539

METHOD FOR COLD FORMING PLASTIC ARTICLE

BACKGROUND OF THE INVENTION

This invention relates to cold forming of plastic substrates, and more particularly, to the cold forming of plastic substrates without the aid of a lubricant.

Thermoplastic polymers such as the olefin polymers, alkyl aromatic resins and the like are conventionally formed into desired shaped articles, such as containers and the like, by injection or compression molding. Also sheets, formed by extrusion or molding of such thermoplastic polymers, may be shaped by such techniques as drape molding or vacuum forming and the like into various useful articles such as cups and generally similar configurations. Such methods call for the heat-plastification of granules or sheets of such materials and subsequent forming of the heat-plastified mass under pressure in a mold or over a form capable of restraining the formed or shaped mass in the desired position until the polymer cools. Conventional molding or forming procedures generally impart to the polymeric material an undesirable heat history which usually decreases the resistance to oxidation and the like. A further disadvantage of hot forming techniques, such as molding and vacuum drawing, is the close temperature control required therein. Hot forming invariably is accompanied by shrinkage problems and the need for precise temperature control. Usually in vacuum drawing operations, the resultant product has non-uniform thickness and frequently areas of greatest draw are undesirably thin.

Inherently, processes involving the heat plastification of polymers are slow and are not readily adapted to high production rates such as may be obtained in metal fabrication, wherein sheet metal may be punched, drawn, and otherwise formed without the temperature of the sheet being raised substantially.

In order to overcome many of the problems arising in hot forming plastic materials, it has been the practice to manufacture hollow articles and other articles of thermoplastic polymers by cold forming process, such as cold drawing, cold stamping and the like. In accordance with cold drawing techniques, plastic sheets are cold drawn (often by so-called "deep-drawing") into the form of cups, bowls, tubs, tubular articles, and other similar such desired configurations. In accordance with another cold forming process, a resin blank (usually in disk form) is cold extruded by placing the blank between two coaxially opposite mold pieces of mating configuration and then squeezing the resin blank therebetween such that at least part of the resin is extruded and flows between the mold pieces to form the desired shape. Pressure between the mold pieces is subsequently relaxed and the molded article is withdrawn therefrom. Other methods for cold forming thermoplastic polymers at temperatures below the heat plastification point of the polymer are also well known. In order to avoid rupture of the thermoplastic polymer substrate during the cold forming operation, it is a practice in the art to coat the substrate and/or the surfaces of the shaping or drawing means with a lubricant such as an oil, an aqueous oil emulsion, soap water, or even for some resins having marked water repellant character, simply water. Unfortunately, however, there is the accompanying problem of lubricant build-up on the die surfaces of the molding device and/or the formed substrate, and it is usually necessary to remove lubricant several times during the procedure from the article and the dies.

In view of the foregoing problems of the prior art, it would be highly desirable to provide a cold forming technique which would enable the practice of a high speed cold forming method without the requirement of lubricant.

SUMMARY OF THE INVENTION

The present invention is such an improved method for cold forming thermoplastic materials. In the practice of the improvement which eliminates the need for lubricating either the cold forming die surface or the thermoplastic substrate, a substrate of thermoplastic organic polymer is surface sulfonated and subsequently cold formed into the desired shape. Surface sulfonation of the substrate of the thermoplastic organic polymer appears to cause the substrate to slide readily upon the cold forming die surfaces without offering the substantial resistance which is characteristic of untreated substrates of thermoplastic organic polymers. Surface sulfonation of the substrate offers the advantage of eliminating any necessity of washing or otherwise delubricating the finished article after cold forming.

Accordingly, in the practice of this invention, substrates of thermoplastic organic polymers can be cold formed by techniques such as deep drawing sheets of such polymers at speeds higher than may be obtained by vacuum forming or injection molding. In fact, metal fabricating techniques of deep drawing can be employed in the practice of the present invention. Practice of the present invention enables the formation of articles which have uniform wall thickness which is about the same as or slightly thicker than that of the parent sheet in the case of deep drawing.

In the practice of the present invention such shaped articles as bowls, tubs, cups, tubular articles and other similar types of containers, caps, and the like are produced.

DESCRIPTION OF THE PREFERRED EMBODIMENTS

Polymers suitably employed in the practice of this invention are sulfonatable, thermoplastic organic polymers which are observed to flow upon the application of moderate stress at the temperatures specified hereinafter. By "sulfonatable polymer" is meant a polymer having replaceable hydrogen atoms on the carbon atoms of the polymer macromolecule. Thus, a polymer such as polytetrafluoroethylene can not be used as a substrate in the practice of this invention because it does not have any replaceable hydrogen atoms and is therefore not readily sulfonatable.

Exemplary suitable thermoplastic organic polymers which may be used as substrates in the practice of this invention are the addition type homopolymers, copolymers, and blends thereof prepared from ethylenically unsaturated monomers such as olefins, e.g., ethylene, propylene, butene-1, 4-methyl-1-pentene, isobutylene, and the like; diolefins, e.g., butadiene and isoprene; vinyl and vinylidene halides, e.g., vinyl chloride and vinylidene chloride; vinyl esters of non-polymerizable carboxylic acids, e.g., vinyl acetate, vinyl propionate, vinyl butyrate, and vinyl benzoate; alkyl esters of $\alpha,\beta$-ethylenically unsaturated carboxylic acids, e.g., ethyl acrylate, methyl methacrylate, isobutyl acrylate, propyl acrylate, ethyl itaconate, and ethyl hydrogen maleate;

monovinylidene aromatic carbocyclic compounds, e.g., styrene, t-butylstyrene, chlorostyrene, α-methylstyrene, ar-methoxystyrene, and ar-methylstyrene; ethylenically unsaturated nitriles and amides, e.g., acrylonitrile, fumaronitrile, methacrylonitrile, methacrylamide, acrylamide, and the like; unsaturated ethers and ketones, e.g., methyl vinyl ketone and methyl vinyl ether; and the like. Also suitable are such polymers as chlorinated polyethylene and chlorinated polypropylene, rubber modified polystryene and styrene polymers, polyamides such as nylon, polyesters such as polyethylene-terephthalate, polycarbonates and polyethers such as polyformaldehyde. Of special interest are predominantly hydrocarbon polymers such as polyethylene, polypropylene, polymethylpentene, polystyrene, rubber modified polystyrene, acrylonitrile/butadiene/styrene terpolymers (so-called ABS resins) and other polymers such as polyvinylchloride, vinyl chloride, vinylidene chloride copolymer, and the like.

Surface sulfonation of the substrate of thermoplastic organic polymer is satisfactorily accomplished by subjecting the surface of the substrate to be sulfonated to the action of a sulfonating reagent such as concentrated sulfuric acid containing at least 98 weight percent of sulfuric acid, oleum, anhydrous solutions of oleum and free sulfur trioxide, trace amounts of about up to about 10 weight percent of diluent sulfur trioxide in an inert chlorinated solvent, or gaseous sulfur trioxide diluted with an inert gas such as air, nitrogen, carbon dioxide and the like. Techniques employing the sulfonation reagents are more fully described in the prior art, e.g., U.S. Pat. Nos. 2,937,066, 2,945,842, and 2,854,477. While surface sulfonation of the polymer is suitably accomplished with any of the aforementioned sulfonating agents, it is generally more advantageous to employ a vapor phase containing from about 1 to about 100 volume percent gaseous sulfur trioxide, preferably from about 2 to 10 percent, in an inert gas such as air, nitrogen, carbon dioxide, or helium. Sulfonation using the vapor phase reagent is preferred since visible attack of the plastic surface is more severe in methods wherein inert solvents are used. The substrate is contacted with a sulfonating agent for periods of time that vary inversely with the temperature and concentration in order to achieve the degree of sulfonation which renders the polymer surface water wettable. Advantageously, the degree of sulfonation is that which provides from about 0.0001 to about 50 milligrams, preferably from about 0.005 to about 1 milligram, of sulfur trioxide equivalents ($SO_3$) in the form of sulfonic acid groups per square centimeter of surface. An especially preferred degree of sulfonation is in the range from about 0.02 to about 0.5 milligram of sulfur trioxide equivalents per square centimeter. For example, if one uses an 8 volume percent concentration of sulfur trioxide in an inert gas such as carbon dioxide at 25°C to sulfonate the plastic substrate to an extent of 0.05 milligram of sulfur trioxide equivalents in the form of sulfonic acid groups per square centimeter of surface, one can use a contact time of about 2 minutes. On the other hand, this concentration can be reduced to 2 volume percent sulfur trioxide, if desired, with an increase in the contact time to about 8 minutes for the same degree of sulfonation. Other changes in temperature, etc., can be made by those skilled in the art.

It is preferable that a generally lower degree of sulfonation is employed with thin polymer substrates rather than with thicker ones. For example, it is found that a sheet or a film having a thickness of 1 mil is completely sulfonated throughout at a degree of sulfonation of about 1 milligram sulfur trioxide equivalent per square centimeter.

Although not required, it is generally preferred to neutralize the sulfonic acid groups on the surface of the plastic substrate by contacting the substrate with gaseous ammonia or dilute aqueous solution of basic materials of inorganic compounds. Examples of these are gaseous and aqueous ammonia, aqueous solutions of alkali metal and alkaline earth metal hydroxides, carbonates, bicarbonates, and the like, such as sodium hydroxide, potassium hydroxide, calcium hydroxide, magnesium carbonate, sodium bicarbonate, etc. The sulfonic acid groups may also be neutralized with organic amines such as the alkyl amines wherein alkyl has from 1 to 15 carbon atoms such as ethylamine, trimethylamine, and the like, the mono-di-tri-alkanol amines wherein alkanol has from 2 to 10 carbon atoms, the polyamines such as polyethyleneimine and other amines set forth in U.S. Pat. No. 2,832,698.

Following sulfonation or sulfonation and neutralization, the plastic substrates are advantageously water washed and dried to remove excess sulfonating or neutralization agents.

Cold forming of the thermoplastic organic polymer substrate is readily accomplished by employing conventional cold forming apparatus. For example in deep drawing of thermoplastic polymer sheets, conventional metal forming punches and dies may be employed. Exemplary apparatus and method for accomplishing such deep drawing are disclosed in U.S. Pat. Nos. 2,468,697 and 2,296,723. In the case of cold flow extrusion, the substrate in the form of a disk or similar such blank is squeezed between dies which mate with one another as disclosed in U.S. Pat. No. 3,021,570. The cold forming operation is carried out at temperatures between about 0° and 200°F and advantageously between about 50° and 130°F. Above about 200°F stretching or orientation occurs and below 0°F the polymer substrate frequently ruptures on cold forming such as in the case of deep drawing. Die clearances are not critical in the practice of this invention and are operative over a wide range, essentially the same range that can be employed in the case of cold forming of lubricated plastic substrates.

In preferred embodiments it is desirable to employ heated dies in the cold flowing operation. The die members are heated to temperatures from about 150° to 200°F. The elevated temperature of the dies appears to enhance the ability of the polymer substrate to slide readily over the die during molding without wrinkling. The use of heated dies coupled with the sulfonated surface of the polymer substrate enhances the success of practicing the present invention in the absence of a lubricating agent.

In addition if deeper shelled containers or other articles are desired than those which are nominally produced in a single drawing or forming operation, successive forming operations can be performed until the desired depth has been achieved without use of lubricating agent. Reworking or annealing of the formed object between successive drawing operations in this case would be similar to those required for reworking lubricated sheet.

The following examples are given to illustrate the invention but should not be construed as limiting its scope. All parts and percentages are by weight unless

EXAMPLE 1

A 20 mil molded disk of acrylonitrile/butadiene/styrene terpolymer having 19.0 weight percent of acrylonitrile, 19.2 weight percent of butadiene, and 61.8 weight percent of styrene is dipped into a glass walled tank containing about 10 volume percent sulfur trioxide in an atmosphere of carbon dioxide maintained at 25°C with agitation provided by means of electric stirrers.

The piece is held in the tank for a period of ½ minute and then removed and sprayed with 2% aqueous ammonia. As a final step, the disk is dipped into a water bath and then dried.

The sulfonated disk (0.02 × 4 inches) is positioned in a deep drawing press having a die of 2 inches in diameter. The disk is held in position by means of a clamping ring. The disk is formed into a cup having a diameter of 2 ½ inches and a depth of about 1 inch by forcing an annular ring against the disk and onto a punch employing pressure of 50 psi. The container is wrinkle free and has uniform wall thickness without any point of rupture. The pressure employed can be varied as is conventional in the art.

For the purposes of comparison and to show the advantages of the present invention an untreated, unlubricated disk of the acrylonitrile/butadiene/stryene terpolymer is positioned in the deep drawing press and drawn in the manner stated above. The resulting container has non-uniform wall thickness and is split at the junction of the side wall and the bottom. Drawing is observed to be incomplete.

What is claimed is:

1. In a process for cold forming a substrate of a sulfonateable polymer which can be cold formed wherein the substrate is positioned in a cold forming apparatus and formed into the desired shaped article at temperature below the heat-plastification point of the polymer; the improvement which comprises surface sulfonating the substrate of thermoplastic organic polymer to a degree sufficient to render the substrate surface water-wettable and subsequently cold forming the substrate to desired shape in the absence of lubricant.

2. The improvement of claim 1 wherein the polymer is predominantly hydrocarbon.

3. The improvement of claim 2 wherein the polymer is a styrene polymer.

4. The improvement of claim 1 wherein the surface sulfonated substrate is neutralized.

5. The improvement of claim 4 wherein neutralization is effected by contacting the surface sulfonated substrate with gaseous ammonia.

* * * * *